United States Patent Office 2,699,229
Patented Jan. 11, 1955

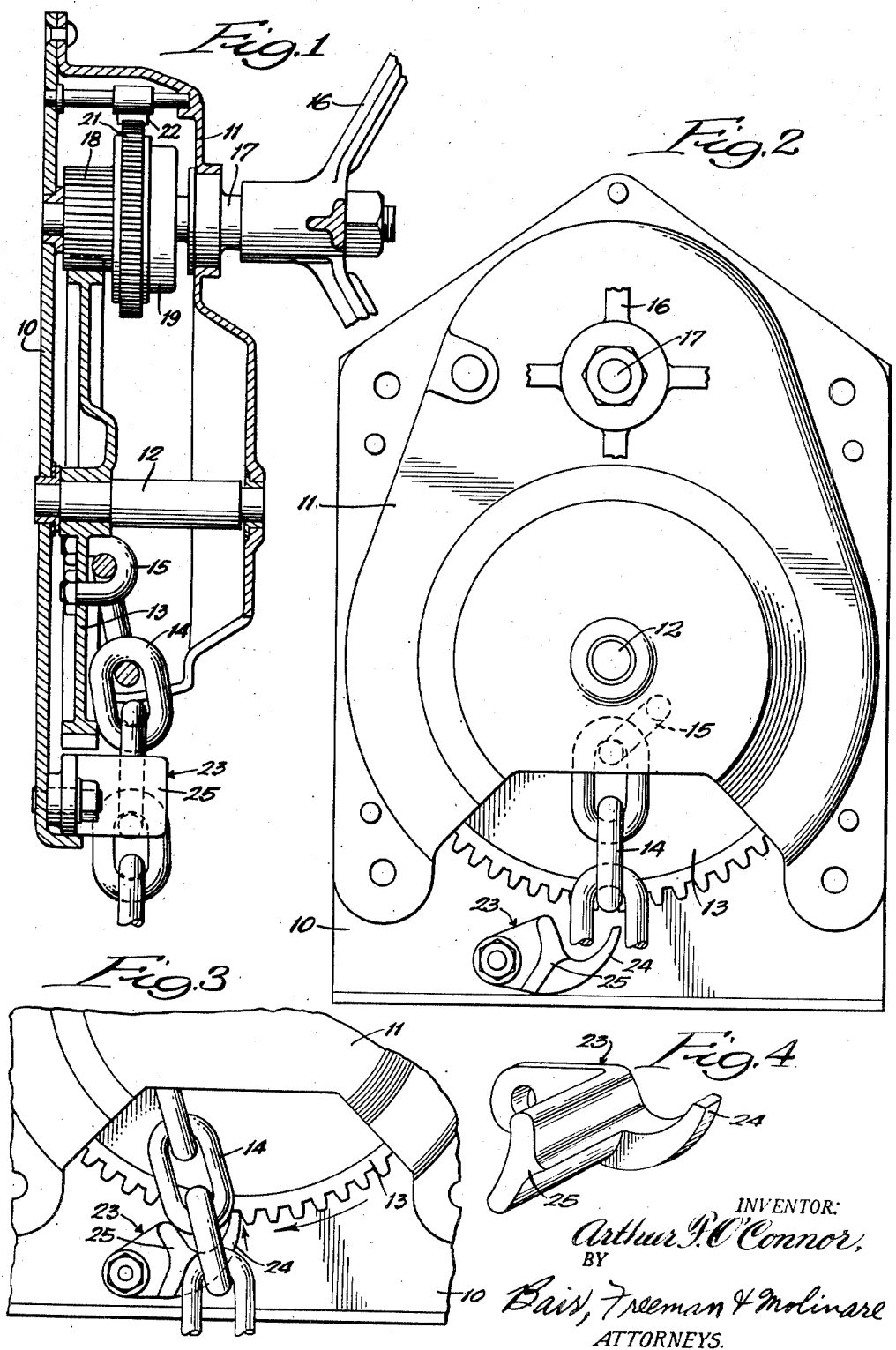

2,699,229

SAFETY DEVICE FOR HAND BRAKE MECHANISM

Arthur F. O'Connor, Chicago, Ill., assignor to Union Asbestos & Rubber Company, Chicago, Ill., a corporation of Illinois Application April 7, 1953, Serial No. 347,368

6 Claims. (Cl. 188—82.7)

This invention relates to hand brake mechanisms and more particularly to a safety device for railroad car hand brake operators.

Railway cars are conventionally equipped with hand brake mechanisms operated through a hand wheel mounted on the car for manually applying the brakes. Such hand brake mechanisms have been a source of numerous accidents due to improper operation which results in spinning of the hand wheel. On many occasions spinning wheels have knocked operators from the car and have caused serious injury or death. It is, therefore, highly desirable to provide in hand brake mechanisms means to prevent spinning of the hand wheel under any conditions.

So-called "non-spin" hand brakes have heretofore been proposed, of which one example is disclosed in my copending application, Serial Number 126,886, filed November 12, 1949, now abandoned. Such mechanisms function very successfully under all normal operating conditions. It has been found, however, that in some cases where the operators are inexperienced and especially when they are attempting to hurry, the operators will turn the hand wheel in the wrong direction from neutral to apply the brake. Even with the no-spin mechanisms as heretofore constructed this type of operation will leave the hand wheel free to spin and may result in injury.

It is accordingly one of the objects of the present invention to provide a hand brake mechanism in which turning of the hand wheel in the wrong direction to apply the brake is positively prevented.

Another object is to provide a hand wheel mechanism in which a pawl is moved into engagement with the brake drum to prevent turning thereof by engagement of the tension element, such as a chain, with the pawl when it is attempted to turn the drum in the wrong direction past neutral.

With this construction, the hand brake mechanism is left free for normal operation under all normal conditions of use, but turning thereof in the wrong direction to apply the brake is positively prevented.

The above and other objects and features of the invention will be more readily apparent from the following description when read in connection with the accompanying drawing in which Figure 1 is a vertical section through a hand brake mechanism embodying the invention;

Figure 2 is a front elevation;

Figure 3 is a partial front elevation showing the safety pawl in engaging position; and Figure 4 is a perspective view of the safety pawl.

The hand brake mechanism, as shown, comprises a housing formed with a back plate 10 adapted to be secured to a vertical wall of a railway car. The housing is completed by a dished cover plate 11 to fit against the back plate 10 around its top and edges and open at its bottom.

The housing carries a drum formed by a shaft 12 journalled in the back plate 10 and the cover plate 11 and carrying an operating gear 13. The shaft 12 itself forms a spindle upon which a tension element, shown as a chain 14, is adapted to be wound to apply the brake. One end of the chain 14 is secured to the gear 13 by a U-shaped clamp 15 and the chain extends through the open bottom of the cover plate 11 to be connected to a brake on the car.

The drum is adapted to be turned to apply the brake by a hand wheel, partially shown at 16, which is connected to a shaft 17 extending through the housing and journalled in the front and back walls thereof. The shaft 17 carries a pinion 18 which may be controlled through a ratchet mechanism, indicated generally at 19, and which may be similar to the no-spin mechanism disclosed in my application referred to above. The ratchet mechanism 19 includes a ratchet wheel 21 engaged by a pivoted pawl 22 to prevent turning thereof in one direction.

In the brake, as shown, it is intended that the drum be turned in a counter-clockwise direction as seen in Figures 2 and 3 for normal brake applications. When the hand wheel is turned in a clockwise direction, counter-clockwise rotation of the drum will result and the chain 14 will be wound on the drum to effect a brake application. To release the brake, the hand wheel is turned in a counter-clockwise direction to release the main ratchet mechanism 19 and enable clockwise turning of the drum.

It has been found in practice that operators will occasionally turn the hand wheel in the wrong direction for applying the brake so that the drum will turn clockwise from the neutral position thereof shown in Figure 2. When this is done, the normal ratchet mechanism cannot function and the hand wheel is free to spin back under tension of the chain 14.

To prevent this type of operation according to the present invention a safety pawl, indicated generally at 23, is pivoted on the back plate 10 below the drum and to the left side of the normal chain position as shown in Figure 2. The pawl includes a finger 24 registering with the gear 13 and adapted to engage the teeth of the gear to prevent rotation thereof in a clockwise direction. The pawl further includes a projecting part 25 extending axially of the pawl and gear into the path of the chain 14 and which normally lies out of contact with the chain. Under normal conditions the pawl will swing down to the position shown in Figure 2 to disengage the gear so that the mechanism is left free for normal operation.

When the drum is turned counter-clockwise for a normal brake application, the lower part of the chain will swing to the right away from the pawl so that the drum can be applied and released in the usual manner. In the event an operator should attempt to turn the drum in the wrong direction for a brake application, the chain will be swung to the left, as shown in Figure 3, to engage the projection 25 of the pawl and to rock the pawl upward until the finger 24 thereon engages the gear 13. It will be seen that a very small amount of turning, on the order of one-fourth of a revolution, will be sufficient to move the pawl up into its locking position, after which no further turning of the drum in the wrong direction can be effected. The pawl, therefore, positively prevents turning of the drum in the wrong direction from neutral, while permitting free normal operation of the mechanism for a properly executed brake application or release. Therefore, spinning of the wheel under chain tension when the wheel has been turned in the wrong direction is positively prevented and one of the sources of injury to operators in using hand brakes is completely eliminated.

While one embodiment of the invention has been shown and described in detail, it will be understood that this is illustrative only and is not to be taken as a definition of the scope of the invention, reference being had for this purpose to the appended claims.

What is claimed is:

1. A hand brake mechanism for railway cars and the like comprising a rotatable drum, means connected to the drum to turn it in either direction, a tension element connected to the drum and adapted to be connected to a brake to apply the brake, ratchet means to limit rotation of the drum in one direction and releasable to permit rotation of the drum in said one direction, the drum having a neutral position in which the tension element is substantially unwound therefrom and the brake is released, and means operated by turning of the drum in said one direction past said neutral position to engage the drum and prevent further rotation of the drum in said one direction.

2. A hand brake mechanism for railway cars and the like comprising a rotatable drum, means connected to the drum to turn it in either direction, a tension element connected to the drum and adapted to be connected to a brake to apply the brake, ratchet means to limit rotation of the drum in one direction and releasable to permit rotation of the drum in said one direction, the drum having a neutral position in which the tension element is substantially unwound therefrom and the brake is released, a movably mounted ratchet member normally lying in an ineffective position out of engagement with the drum but movable into an effective position in engagement with the drum to prevent rotation thereof in said one direction, and a part on the ratchet member to be engaged by the tension element when it is moved by turning of the drum in said one direction past its neutral position to move the ratchet member to its effective position.

3. A hand brake mechanism for railway cars and the like comprising a rotatable drum, means connected to the drum to turn it in either direction, a tension element connected to the drum and adapted to be connected to a brake to apply the brake, ratchet means to limit rotation of the drum in one direction and releasable to permit rotation of the drum in said one direction, the drum having a neutral position in which the tension element is substantially unwound therefrom and the brake is released, a ratchet member movably mounted adjacent to and at one side of the tension element normally lying in an ineffective position but movable to an effective position to engage the drum and prevent rotation thereof in said one direction, the tension element clearing the ratchet member when the drum is turned in the other direction from its neutral position but engaging the ratchet member to move it into its effective position when the drum is turned in said one direction from its neutral position.

4. A hand brake mechanism for railway cars and the like comprising a hollow housing having an opening at one end, a drum rotatably mounted in the housing, a tension element connected at one end to the drum and extending through the opening for connection to a brake, the drum having a neutral position in which the tension element is substantially unwound therefrom and the brake is released, and a pawl pivoted in the housing adjacent to the opening normally lying in an ineffective position out of engagement with the drum but movable to an effective position to engage the drum and hold it against rotation in one direction, the tension element engaging the pawl to move it to its effective position when the drum is turned in one direction from its neutral position.

5. A hand brake mechanism for railway cars and the like comprising a hollow housing having an opening at one end, a drum rotatably mounted in the housing, a tension element connected at one end to the drum and extending through the opening for connection to a brake, ratchet means in the housing normally to hold the drum against rotation in one direction and releasable to permit rotation of the drum in said one direction, the drum having a neutral position in which the tension element is substantially unwound therefrom and the brake is released, a pawl pivoted in the housing normally lying in an ineffective position out of engagement with the drum but movable to an effective position in engagement with the drum to prevent rotation thereof in said one direction, and means operative only upon movement of the drum past its neutral position in said one direction to move the pawl to its effective position.

6. A hand brake mechanism for railway cars and the like comprising a hollow housing having an opening at one end, a drum rotatably mounted in the housing, a tension element connected at one end to the drum and extending through the opening for connection to a brake, ratchet means in the housing normally to hold the drum against rotation in one direction and releasable to permit rotation of the drum in said one direction, the drum having a neutral position in which the tension element is substantially unwound therefrom and the brake is released, a pawl pivoted in the housing normally lying in an ineffective position out of engagement with the drum but movable to an effective position in engagement with the drum to prevent rotation thereof in said one direction, and a part on the pawl engageable by the tension element only when the drum is turned past its neutral position in said one direction to move the pawl to its effective position.

References Cited in the file of this patent

UNITED STATES PATENTS 1,125,107    Jacques _____ Jan. 19, 1915